(12) United States Patent
Paxinos et al.

(10) Patent No.: US 9,319,746 B2
(45) Date of Patent: *Apr. 19, 2016

(54) METHOD AND APPARATUS FOR COVIEWING VIDEO

(71) Applicant: NetTalk.com, Inc., North Miami, FL (US)

(72) Inventors: Garry M Paxinos, Pompano Beach, FL (US); Anastasios Kyriakides, Hollywood, FL (US); Kenneth Alvin Hosfeld, Coral Springs, FL (US); Anastasios Nicholas Kyriakides, Plantation, FL (US)

(73) Assignee: NetTalk.com, Inc., North Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/863,055

(22) Filed: Sep. 23, 2015

(65) Prior Publication Data

US 2016/0014463 A1    Jan. 14, 2016

Related U.S. Application Data

(63) Continuation of application No. 14/057,428, filed on Oct. 18, 2013, now Pat. No. 9,148,611.

(60) Provisional application No. 61/715,553, filed on Oct. 18, 2012, provisional application No. 61/798,034, filed on Mar. 15, 2013.

(51) Int. Cl.
*H04N 7/14* (2006.01)
*H04N 21/4788* (2011.01)
*H04N 21/43* (2011.01)
*H04N 21/431* (2011.01)
*H04N 21/439* (2011.01)

(52) U.S. Cl.
CPC ........... *H04N 21/4788* (2013.01); *H04N 7/148* (2013.01); *H04N 21/4307* (2013.01); *H04N 21/439* (2013.01); *H04N 21/4316* (2013.01)

(58) Field of Classification Search
CPC combination set(s) only.
See application file for complete search history.

(56) References Cited

U.S. PATENT DOCUMENTS

| | | | |
|---|---|---|---|
| 2005/0088513 A1* | 4/2005 | Oswald | H04N 7/147 348/14.02 |
| 2007/0195158 A1* | 8/2007 | Kies | H04L 65/604 348/14.01 |
| 2008/0275785 A1 | 11/2008 | Altberg | 705/14 |
| 2009/0015651 A1* | 1/2009 | Togami | G10L 21/00 348/14.01 |
| 2011/0018963 A1 | 1/2011 | Robinson | 348/14.16 |
| 2011/0154417 A1 | 6/2011 | Civanlar | 725/105 |
| 2011/0197132 A1 | 8/2011 | Escoda | 715/733 |
| 2011/0208807 A1* | 8/2011 | Shaffer | G06F 3/0418 709/203 |
| 2012/0206558 A1* | 8/2012 | Setton | H04N 7/147 348/14.03 |

* cited by examiner

*Primary Examiner* — Joseph J Nguyen
(74) *Attorney, Agent, or Firm* — Niro McAndrews, LLC (57) ABSTRACT

A method, apparatus, and system to provide the ability for a user to make audio and/or audio-video phone calls simultaneously while watching (co-viewing) provider video content in remote locations. A control system is provided to set up call, direct provider video content, and provide for the phone calls and video content to be delivered and then synchronized. The phone calls may be routed by the control system to PSTN destinations or Internet based destinations and calls made or received may be bridged to other Internet based sources. The provider video content may be provided directly from its source or routed through NAT traversal or through the control system.

20 Claims, 5 Drawing Sheets

METHOD AND APPARATUS FOR COVIEWING VIDEO

CROSS REFERENCE TO RELATED APPLICATIONS

This is application is a continuation of U.S. patent application Ser. No. 14/057,428 filed Oct. 18, 2013 and titled Method and Apparatus for Coviewing Video that claimed priority to both U.S. Provisional Application 61/715,553 filed Oct. 18, 2012 and U.S. Provisional Application 61/798,034 filed Mar. 15, 2013, the contents of which are all herein incorporated by reference.

BACKGROUND OF THE INVENTION

1. Field of the Invention

This invention relates generally to integrated telecommunications and multimedia systems and applications and, more particularly, to a method and apparatus for integrating provider video content with phone call communications in real time.

2. Description of the Prior Art

Television (or "TV") services which provide live video or recorded video content through channels such as over air broadcasts, cable TV systems, and satellite TV systems ("provider video content" or "TV style video content") are well known. Over air broadcasts have been offered for decades, but typically only permit access to a few channels (five to ten). Cable TV and satellite systems have grown in popularity over the past few decades and typically offer a greater number of channels, in the range of tens or hundreds, as well as interactive services aimed at improving aspects of the user's viewing experience such as recording and playback and premium content for purchase. Recently, access to TV style video content has additionally been availed through the Internet, where such video can often be streamed for real time viewing and/or downloaded for subsequent viewing. On the Internet, many of the service enhancements which have been introduced by Cable TV and satellite systems are present in some form. In addition, due to the nature of the Internet and its delivery protocols, there remain opportunities to further enhance or supplement TV style video content provided over the Internet.

Similarly, various telephone and voice communication services which facilitate remote audio or audio/video communications ("phone call" or "phone call communications") over wired or wireless networks are well established. Traditional wired telephone networks date back more than a century and, more recently, wireless networks and Voice over Internet Protocol ("VoIP") have introduced new communication protocols which provide increased functionality and often decrease costs. Notably, the rise in phone call communications through VoIP (and thus over the Internet) has largely coincided with the rise in the delivery of provider video content delivered over the Internet. A problem which still exists, however, is phone call communications and provider video content have remained largely separate services, unable to provide users with enhanced, integrated functionality. While users in remote locations can engage in a phone call and watch the same provider video content from the same source, the users cannot participate in an service wherein their phone call and provider video content viewing are integrated and synchronized together. Thus, there remains a need for a method and apparatus which could provide a coviewing system that would allow users in remote locations to engage in a phone call which was integrated with and occurring in conjunction with the viewing of the same provider video content. It would be helpful if such a coviewing system was structured to enable the synchronization of the video content being viewed by each user. It would be additionally desirable for such a coviewing system was structured to utilize smart echo cancellation which simultaneously accounted for audio from the provider video content and from the phone call.

The Applicant's invention described herein provides for a system adapted to allow coviewing of provider video content such that phone call communications between a plurality of users has been integrated with a provider video content viewing session. The primary components of Applicant's method and apparatus for coviewing include a coviewing control system and a plurality of user interfaces which include audio and video inputs and audio and video outputs. When in operation, the method and apparatus for coviewing allows users in remote locations to engage in an phone call and provider video content viewing session simultaneously, whereby the phone call communications and provider video content have been integrated into a unified and synchronized interface to be broadcast by a output device simultaneously. As a result, many of the limitations imposed by the prior art are removed.

SUMMARY OF THE INVENTION

A method, apparatus and system to provide the ability for a user to make audio and/or audio-video calls simultaneously while watching (co-viewing) the same provider video (e.g.: program, movie or sporting event). The calls may be to PSTN destinations or internet based destinations. Calls made or received may be bridged to other services such as Google Voice, Skype, Facebook and others.

The invention incorporates multiple user interfaces. The interfaces include video displays. Each display may have a camera, whereby the camera may provide images of the respective user. Each video display includes a call transmitter and call receiver. The transmitter and receiver may be the same element.

Video can be displayed as an overlay on a display such as Picture in Picture. TV program can be 'squeezed-back' on a display from a video call or other transmitted text. Video can also be placed on an 'edge' (top, bottom, left, right) of a display. Video can also be overlaid in windows such, so called 'picture in picture' or PIP. The invention includes the optional provision of the ability to synchronize playback of TV programming so both parties watch the same video 'scene/play' at the same time. The invention may also include intelligent echo cancelation that suppresses both normal audio echo as well as the audio associated with the TV program.

Call setup may be performed through a Coviewing Control System ("CCS"). The CCS may be a dedicated system or leverage an existing telephony, conferencing or other system. Video from media may be routed directly or through some form of NAT traversal, or through the control system It is an object of this invention to provide a coviewing system which would allow users in remote locations to engage in an audio only or audio/video phone call which was integrated with and occurring in conjunction with the viewing of the same provider video content.

It is another object of this invention to provide a coviewing system structured to enable the synchronization of the video content being viewed by each user.

It is yet another object of this invention to provide a coviewing system structured to utilize smart echo cancellation which simultaneously accounted for audio from the provider video content and from the phone call.

DETAILED DESCRIPTION OF THE INVENTION

Figure 1:
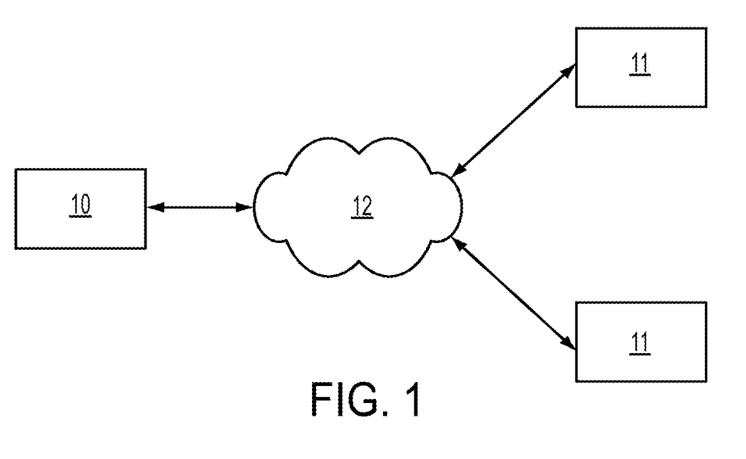
FIG. 1 shows a general process flow according to the present invention.

Referring now to the drawings and in particular FIG. 1, a system overview of the operating components of a method and apparatus for coviewing is shown. A coviewing control system 10 is provided to perform server and administrator functions for a plurality of set top boxes 11 that perform client functions and provide user interfaces. The coviewing control system 10 is utilized to provide a call manager, which is implemented through a hardware and/or a software configuration. The call manager is used to provide phone call address information required for phone call setup and may work in conjunction with the processor of set top boxes 11 for setting up all calls, both incoming and outgoing, between set top boxes 11 or a set top box 11 and another device. It is contemplated that the call manager may be implemented through a dedicated system or by leveraging existing telephony or conferencing systems.

The coviewing control system 10 and the set top boxes 11 are configured to maintain a network connection to the Internet 12. In this manner, the coviewing control system 10 and the set top boxes 11 are adapted to communicate data in real time with each other as well as access data from or transmit data to any specific location on the Internet 12. For example, the set top boxes 11 may utilize existing protocols to access provider video content through its connection to the Internet, whether at the direction of or independent of any action of the coviewing control system 10. Similarly, set top boxes 11 may connect phone calls through a VoIP interface to publically switched telephone network destination or an Internet based destination. In this regard, it is contemplated that set top boxes 11 may be configured to handle incoming and outgoing phone calls or bridge such phone calls to services such as Google Voice, Skype, and Facebook.

Figure 2:
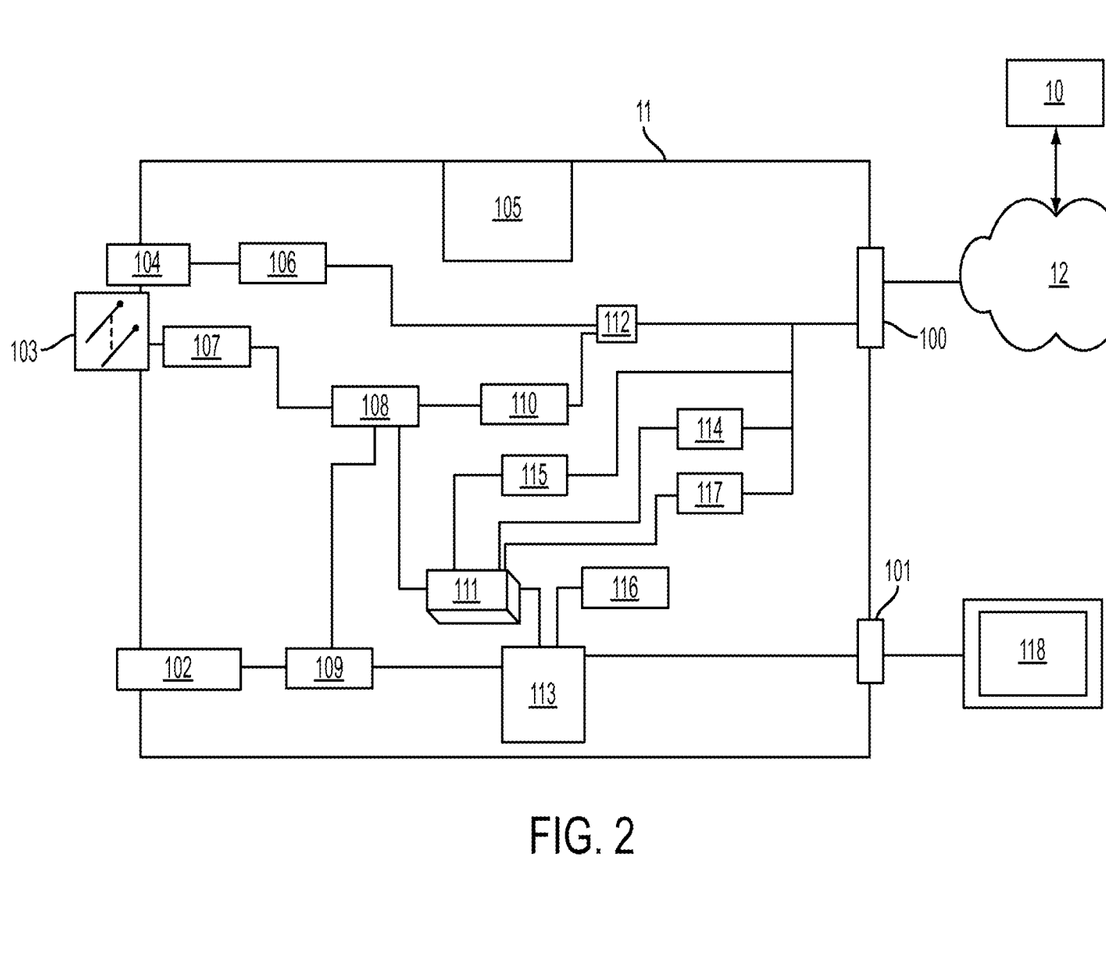
FIG. 2 is a block diagram of the components of a set top box adapted for coviewing and built in accordance with the present invention.

Referring now to FIG. 2, the primary components of a set top box 11 built in accordance with the present invention are defined as interface components and processing components. The interface components include a networking interface 100, an output interface 101, a content input interface 102, an audio input interface 103 and a video input interface 104. The network interface 100 provides the network connection between the set top box 11 and the Internet so as to enable the set top box 11 to communicate data to locations on the world wide web. The network interface 100 is defined as a single connection which provides Internet access to a plurality of components in the set top box 11 in one embodiment. In alternate embodiments, the network interface 100 defines a plurality of connections which include wired connections, wireless connections or possibly wired and wireless connections. In other embodiments, connection protocols such as USB, Ethernet, WiFi, LTE, WiMax, 3G/4G/Cellular data may be utilized in addition or in the alternative by the network interface 100. It is contemplated that other categories of media players/receives can be utilized in the alternative to, or in addition to, a set top box 11. Alternative media players/receivers, such as game consoles, Internet media players/receives, and TVs configured to include media playing/receiving components may be configured in accordance with the present invention as described above.

The output interface 101 is configured to provide signals which would allow a television or other audio/video display device to display and otherwise output audio and video signals relating the provider video content, phone call communications, or other content received from the Internet. In one embodiment, the output interface 101 is defined as a HDMI outlet. In alternate embodiments, audio and video outputs may be provided through the output interface 101 via a single or multiple connectors which may be wired, wireless, or a combination of wired and wireless. In other embodiments, connection protocols such as coaxial, USB, Ethernet, WiFi, WiMax, TOSLINK, SP/DIF, HDMI, component, and composite may be used by the output interface 101 to deliver audio and video signals to the desired audio/video display device.

The content input interface 102 provides a supplementary input for provider video content which is not being received directly from the Internet 12 through the network interface 100. The content input interface 102 utilizes one or more connection ports such as coaxial, component, composite, HDMI, SCART, TOSLINK, SP/DIF to receive input signals from providers of provider video content, such as Cable TV signals, satellite signals, analog or digital antenna inputs. It is contemplated that a plurality of one or more these connection ports may be provided. This signal can be used supplement a provider video content signal which is being received from the Internet 12. In the alternative, the set top box 11 can directly use the broad video content signal from the content input interface 102 while supplementing that signal with data from the Internet 12.

The audio input interface 103 allows for audio from the area surrounding the set top box 11 to be captured and utilized in the operations of the set top box 11. The audio input interface 103 defines an audio pick up device, which may be a single microphone or a microphone array to enable additional echo cancelling capability. In one embodiment, the audio pick up device is an internal component of the set top box 11 while in other embodiments, the audio pick up device is an external component connected to the set top box or a combination of internal and external components.

The video input interface 104 captures video from the area surrounding the set top box 11 to be utilized in the operations of the set top box 11. The video input interface 104 is defined in one embodiment by a internally mounted video camera. In other embodiments, the video camera may be externally disposed and connected to the set top box 11 via a connection, which may be either wired, or wireless, or a combination of both.

The processing components include a central processing unit 105, a local video encoder 106, a local audio preamp 107, a echo canceller 108, a content decoder 109, a transmission encoder 110, an audio video decoder component 111, an audio video combiner 112, a combiner/mixer 113, a call in filter 114, coviewing audio video filter 115, a graphics processor 116, and a third party app processor 117. In operation, the central processing unit 105 acts as a gatekeeper/taskmaster and regulates the system to ensure all interactions are taking place at the correct time and in the correct order.

To handle the initial processing of locally generated inputs, the local video encoder 106 receives and encodes video signals from the video input interface 104 and then transmits the encoded local video signal to the audio video combiner 112. In addition, the local audio preamp 107 is connected to the audio input interface 103 so as to receive audio signals from the audio input interface 103, amplify them, and transmit the amplified signals to the echo canceller 108. Furthermore, the content decoder 109 receives encoded provider video content from the content input interface 102, decodes it, and transmits the decoded signals to the echo canceller 108.

To handle the initial processing of remotely generated inputs, the call in filter 114 filters out data relating to active, requested or pending phone calls in the signals received from the Internet through the networking interface 100. This phone call data is then transmitted to the audio video decoder component 111 to be decoded and sent to the echo canceller 108 and the combiner/mixer 113. The coviewing audio video filter 115 filters out data relating active requested, or pending coviewing sessions to enable it to be directed to the audio video decoder component 111 to be decoded and sent to the echo canceller 108 and the combiner/mixer 113. The graphics processor 116 provides menu overlay information to the combiner/mixer 113 to enable the display of the same on the local video output. The third party app processor 117 enables the operation of third party apps which provide additional provider video content on the set top box 11. The third part app processor 117 transmits received provider video content to the audio video decoder component 111 to be decoded and sent to the echo canceller 108 and the combiner/mixer 113. It is contemplated that the audio video decoder component may be embodied as a single decoder or a plurality of audio/video decoders.

Once the locally and remotely generate inputs are received and initially processed, the outputs of the set top box 11 are configured through the echo canceller 108, the transmission encoder 110, audio/video combiner 112, and the combiner/mixer 113. The echo canceller 108 receives audio data from a plurality of sources relating to noise which is being generated around the set top box 11 generates a signal which enables echo cancellation and unwanted noise suppression. When a point to point audio call, audio/visual call, or co-viewing call is made the echo canceller 108 takes the audio signal that would emit from the television or display device, or audio system that is outputting an audio signal coming through the set top box 11, and generate a cancelling signal that would mix with the signal coming into the set top box 11 via the audio pick up device, thus cancelling the unwanted audio signal and preventing unwanted feedback.

The transmission encoder 110 encodes data from the echo canceller 108 so as to prepare it to be transmitted to a desired networked target. The audio/video combiner 112 merges the audio and video outbound feeds together. This is accomplished by taking the audio signals from the echo canceller 108 and combining them with the video signal generated by the local video encoder 106. In other embodiments, the transmission encoder 110 is not included and the audio and video feeds are transmitted as separate signals.

The combiner/mixer 113 combines different sources of the audio/video signals which are to be provided to the television 118 or desired display device and routes the combined signal to the output interface 101. It is contemplated that SMS, gaming audio/video, audio call, video call, video/audio call, interactive menu displays, co-viewing displays, and others may be provided to the output interface 101 by the combiner/mixer 113. In some embodiments, the combiner/mixer 113 includes an encoder, while in other embodiments, an encoder is provided in the output interface 101.

Figure 3:
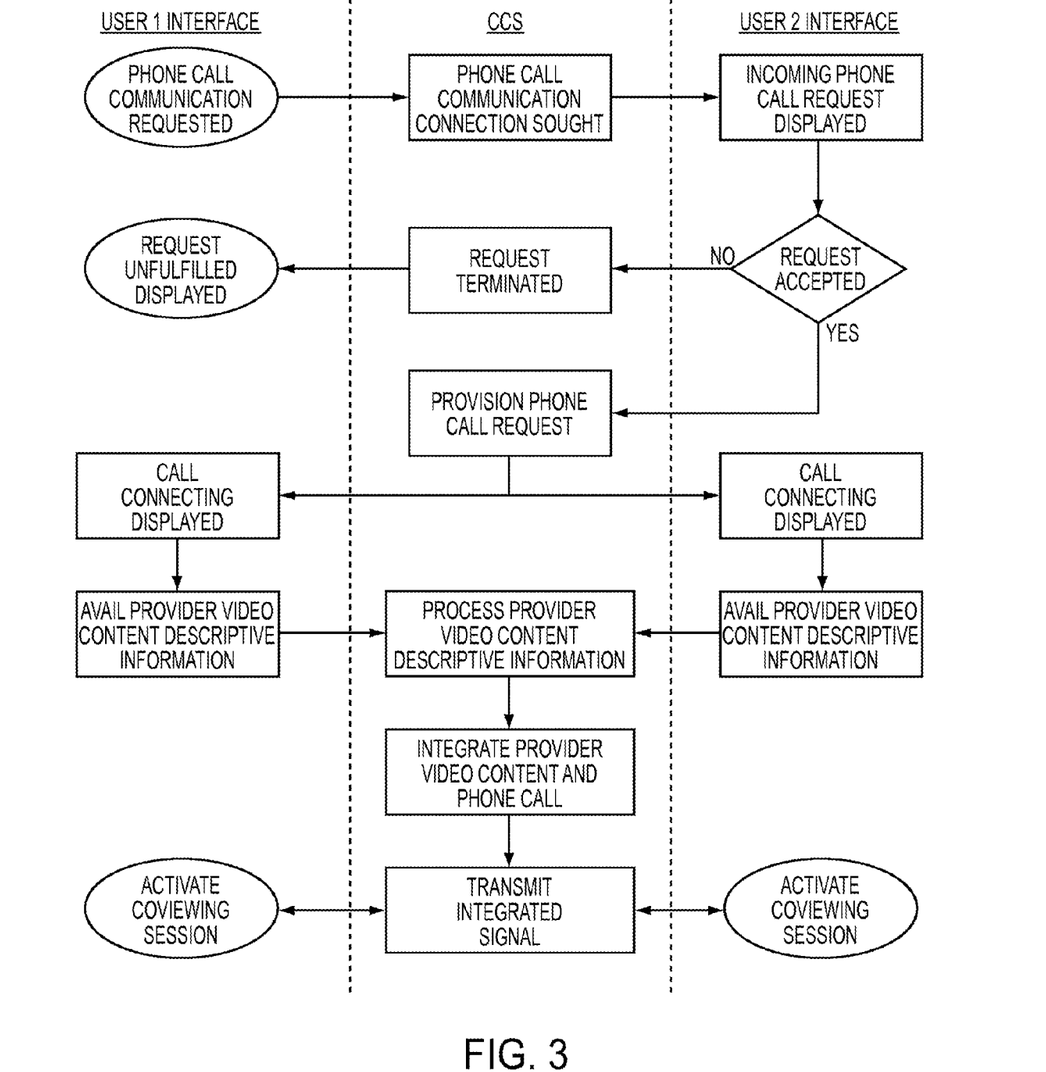
FIG. 3 depicts the coviewing set up process according to the present invention.

Referring now to FIG. 3, the process of initiating a coviewing session between two devices built in accordance with the present invention begins with a first user requesting a coviewing phone call connection with a second user at a specified or otherwise specific location (such as phone number, email address, or other unique identifier) on the first user's device interface. The request is transmitted to the coviewing control system, which locates the second user's through the provided unique identifier. The request is sent to the second user's device interface, and an option to accept or decline the request to provided to the second user's device interface. If the request is not accepted on the second user's device interface, the coviewing control system terminates the request and notifies the first user's device interface that the request has been unfulfilled. If the second user's device interface accepts the request, the coviewing control system begins provisioning the call request. Such provisioning enables a phone call signal which will be exchanged in real time by the respective user's device interfaces to be generated.

During the provisioning of the phone call request, the coviewing control system notifies each user's device interface that a call is provision and causes the display a message advising that the call is connecting. Upon receiving this notification, each user's device interface transmits information relating to any provider video content currently being displayed by the respective user's device interface. This information typically includes the current program, the current channel and a time stamp indicating where in program duration wise the user's device interface is. The coviewing control system processes this information by generating a signal which synchronizes the provider video content being watched on the user's respective device interface. The synchronized provider video content signal is then integrated with the phone call signal to form an integrated coviewing signal. The coviewing signal is then transmitted to each user's device interface, which causes the user's device interface to each actuate a coviewing session. In actuating a coviewing session, the user's device interfaces begin to display or otherwise play the provider video content and phone call communications as directed by the coviewing control system and transmit capture phone call related audio and video information to the coviewing control system.

In one embodiment, the coviewing control system merely integrates a pointer to a source of provider video content in the step of integrating provider video content and phone call. In such an embodiment, the provider video content is provided to each of the user's device interfaces directly from a provider or through a form of network address translation traversal.

In one embodiment, the step of processing provider video content includes allowing the user's device interfaces to select a particular program or channel to watch during the coviewing session.

Figure 4:
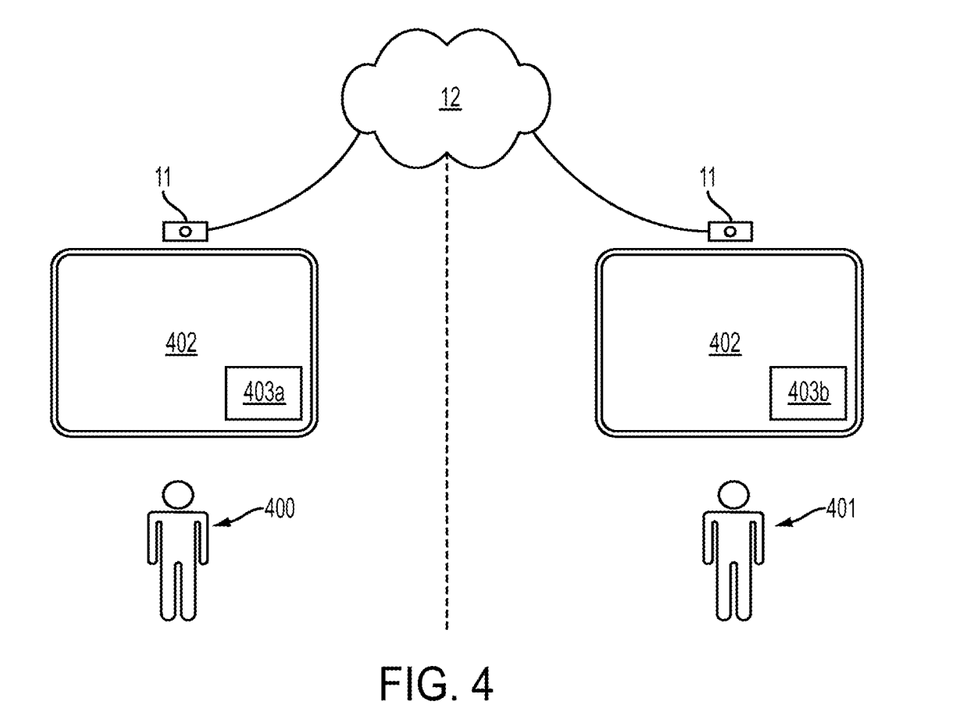
FIG. 4 depicts an exemplary user interface of a coviewing session according to the present invention.

Referring now to FIG. 4, when a coviewing session is active, a user in a first location 400 and a user in a second location 401 can watch the same program and/or channel on a television screen 402 while having a video phone call, wherein the program and the video feed 403a, 403b from the other user are both visible on the user's respective television screen 402. In embodiments where video call is not provided for, users can still utilize coviewing to participate in a phone call while watching synchronized provider video content in remote locations.

Figure 5:
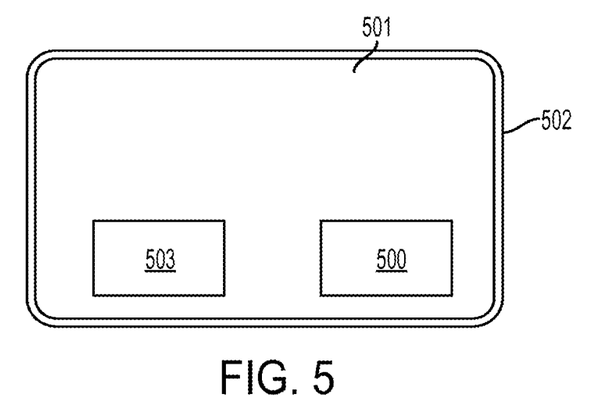
FIG. 5 depicts a user interface of a video content overlay coviewing session according to the present invention.

Referring now to FIG. 5, in one embodiment, the video 500 from the phone call communication of a coviewing session is displayed as an overlay on top of the provider video content 501 being displayed on the display device 502. In some embodiments, the coviewing session provides in addition to the remotely generated phone call communication video 500 the locally generated video 503.

Figure 6:
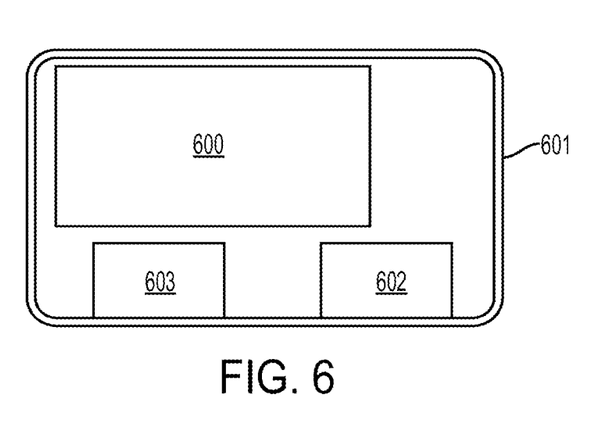
FIG. 6 depicts a user interface of a video content squeeze back coviewing session according to the present invention.

Referring now to FIG. 6, in another embodiment, during a coviewing session, the provider video content video 600 is squeezed back on the display device 601 to provide a space in which the video 602 from the phone call communication of a coviewing session is displayed. It is contemplated that the video can be squeezed back on the edge of a display device so as to provide space on an opposing edge or squeezed back to a more centrally located position on the display device to provide space along the perimeter of the provider video content 600. In this embodiment, the coviewing session may again provides in addition to the remotely generated phone call communication video 602 the locally generated video 603.

In one embodiment, the provider video content and/or user interfaces and/or video from phone call communications may be selectively displayed on a selected device or a plurality of selected devices. For example, a coviewing system may enable the video from provider video content to be displayed on a first display device, such as a mobile electronic device (tablet, smartphone, etc.), while the video from the phone call communication of a coviewing session is displayed on a second display device, such as a TV. Similarly, a coviewing system may enable menus and other user interface elements on a mobile device and video on a TV. Further, a coviewing system may enable all video and user interfaces to be displayed on a mobile device.

The instant invention has been shown and described herein in what is considered to be the most practical and preferred embodiment. It is recognized, however, that departures may be made therefrom within the scope of the invention and that obvious modifications will occur to a person skilled in the art.

We claim:

1. A method for integrating video content with telephony communications, comprising the steps of:
    receiving, with a first user interface device, an electronic data communication from a remote second user interface device over an electronic network;
    rendering, with the first user interface device, the video content;
    providing, with the first user interface device, a first audio signal based on the electronic data communication from the remote second user interface device;
    receiving, with the first user interface device, a second audio signal including
        a first component from the video content,
        a second component from the first audio signal, and
        a third component distinct from both the video content and the first audio signal;
    echo cancelling, with the first user interface device, both the first component and the second component from the second audio signal to create a third audio signal;
    transmitting, from the first user interface device, the third audio signal to the remote second user interface device;
    generating, with the first user interface device, a first visual signal from a recorded image;
    transmitting, with the first user interface device, the first visual signal to the second user interface device;
    receiving, with the first user interface device, a second visual signal from the second user interface device; and
    rendering, with the first user interface device, the second visual signal, wherein the step of rendering the second visual signal obscures a portion of the video content.

2. The method of claim 1, wherein the step of rendering, with the first user interface device, the video content includes synchronizing the video content with a video display on the remote second user interface device.

3. The method of claim 1, wherein the step of rendering, with the first user interface device, the video content includes frame synchronizing the delivery of the video content with a video display on the remote second user interface device.

4. The method of claim 1 wherein the video content is broadcast video content from a broadcaster.

5. The method of claim 1 further comprising the step of:
    receiving, with the first user interface device, the video content from a broadcaster.

6. The method of claim 5, wherein the step of rendering, with the first user interface device, the video content includes synchronizing the display of the video content on the first user interface device with a delivery of the video content from the broadcaster to the second user interface device.

7. The method of claim 1 wherein the telephony communications are videotelephony communications, and a portion of the third component is from the voice of a first user.

8. The method of claim 1 wherein the step of rendering the second visual signal with the first user interface device includes obscuring the portion of the video content with an obscuring function selected from a group consisting of a squeeze-back function and a picture-in-picture function.

9. The method of claim 1 further comprising the step of:
    recording the recorded image with a camera associated with the first user interface device.

10. A method for integrating video content with phone call communications, comprising the steps of:
    providing a control system configured to connect to and communicate electronic data with at least a first user interface device and a second user interface device over an electronic data network, wherein
    the first user interface device and the second user interface device are disposed in remote locations and
    the first user interface device and second user interface device each include an echo cancellation component which is configured to enable the first user interface device and the second user interface device, respectively, to suppresses both normal audio echo from phone call broadcasting as well as the audio associated with the video content;
    receiving, with the control system, a first visual signal from the first user interface device;
    receiving, with the control system, a second visual signal from the second user interface device;
    transmitting, with the control system, the first visual signal to the second user interface device;
    transmitting, with the control system, the second visual signal to the first user interface device;
    enabling by the control system video content delivery defined by the delivery of a signal of video content to the first user interface device and the second user interface device which represents the same video content programming, enabling the first user interface device and the second user interface device to cause to be broadcast the same video content, wherein a portion of the video content is obscured by the broadcast of the first or second visual signal; and
    enabling by the control system integrated phone call communications defined by the delivery of a first audio signal of a first phone call generated at the first user interface device to the second user interface device and a second audio signal of a second phone call generated at the second user interface device to the first user interface device, enabling the first user interface device to cause at least the second audio signal generated at the second user interface device to be broadcast and the second user interface device to cause at least the first audio signal generated at the first user interface device to be broadcast.

11. The method of claim 10, wherein the step of enabling by the control system video content delivery additionally includes causing the video content signal delivered to each of the first user interface device and the second user interface device to be synchronized for the time elapsed in the program, enabling the first user interface device and the second user interface device to cause to be broadcast a synchronized version of the same video content on a first output device and a second output device, respectively.

12. A system for integrating video content with phone call communications, comprising:
a control system configured to connect to and communicate electronic data with at least a first user interface device and a second user interface device over an electronic data network;
the first user interface device and the second user interface device being disposed in remote locations;
the control system enabling video content delivery defined by the delivery of a signal of video content to said first user interface device and said second user interface device which represents the same video content, enabling said first user interface device and said second user interface device to cause to play the same video content;
the control system enabling integrated phone call communications, defined by the delivery of a first audio signal of a phone call generated at the first user interface device to the second user interface device and a second audio signal of a phone call generated at the second user interface device to the first user interface device, enabling
the first user interface device to cause at least the second audio signal generated at the second user interface device to be played and
the second user interface device to cause at least the first audio signal generated at the first user interface device to be played;
wherein the first user interface device and second user interface device each include an echo cancellation component which is configured to enable the first user interface device and the second user interface device, respectively, to suppresses both normal audio echo from phone call playing as well as the audio associated with the video content; and
the first user interface device includes
a video input interface configured to provide an image,
a processing system configured to generate a first visual signal from the image, and
a network interface configured to
transmit the first visual signal to the second user interface device and
receive a second visual signal from the second user interface device,
wherein the processing system
renders both the video content and second visual signal to create an output video signal,
transmits the output video signal to a output interface, and
obscures a portion of the video content in the output video signal based upon the second visual signal.

13. The system of claim 12, wherein the control system enables the first user interface device and the second user interface device to play a synchronized version of the same video content on a first output device and a second output device, respectively.

14. The system of claim 12, wherein the control system enables the first user interface device to cause audio and video generated at said second user interface device to be played.

15. The system of claim 12 wherein the video content is a sporting event program produced by a broadcast provider.

16. The system of claim 12 wherein said control system enables the delivery of the video content to the first user interface device and the second user interface device by providing the video content directly from the control system to the first user interface device and the second user interface device.

17. The system of claim 12 wherein the echo cancellation component of the first user interface device receives audio signals from a first source and a second source.

18. The system of claim 17 wherein the audio signals from the first source are amplified.

19. The system of claim 17 wherein a portion of the audio signal from the first source is suppressed based on the audio signal from the second source.

20. The system of claim 12 wherein the processing system is configured to obscure the portion of the video content with an obscuring function selected from a group consisting of a squeeze-back function and a picture-in-picture function.

* * * * *